United States Patent
Hill et al.

(10) Patent No.: US 9,527,102 B2
(45) Date of Patent: *Dec. 27, 2016

(54) SPRINKLER SENSING DEVICE

(71) Applicant: The Toro Company, Bloomington, MN (US)

(72) Inventors: Jason Lester Hill, Capistrano Beach, CA (US); Thomas H. Runge, Manasquan, NJ (US); Alex Korol, Diamond Bar, CA (US)

(73) Assignee: The Toro Company, Bloomington, MN (US)

( * ) Notice: Subject to any disclaimer, the term of this patent is extended or adjusted under 35 U.S.C. 154(b) by 278 days.

This patent is subject to a terminal disclaimer.

(21) Appl. No.: 14/286,922

(22) Filed: May 23, 2014

(65) Prior Publication Data

US 2014/0358305 A1  Dec. 4, 2014

Related U.S. Application Data

(63) Continuation of application No. 13/212,933, filed on Aug. 18, 2011, now Pat. No. 8,733,155.

(60) Provisional application No. 61/375,747, filed on Aug. 20, 2010.

(51) Int. Cl.
| | |
|---|---|
| *G01N 25/56* | (2006.01) |
| *F16K 17/36* | (2006.01) |
| *B05B 15/10* | (2006.01) |
| *B05B 12/00* | (2006.01) |
| *A01G 25/16* | (2006.01) |
| *B05B 3/04* | (2006.01) |

(52) U.S. Cl.
CPC .............. *B05B 15/10* (2013.01); *A01G 25/16* (2013.01); *B05B 12/008* (2013.01); *B05B 3/0422* (2013.01); *Y10T 137/189* (2015.04)

(58) Field of Classification Search
CPC .......... B05B 12/08; B05B 15/10; B05B 15/06; A01G 25/16
USPC ... 73/570, 589, 584, 585, 587, 591, 592, 73; 239/203, 204, 206, 68, 69, 63, 64, 67; 137/78.3
See application file for complete search history.

(56) References Cited

U.S. PATENT DOCUMENTS

| | | |
|---|---|---|
| 5,040,409 A | 8/1991 | Kiewit |
| RE35,037 E | 9/1995 | Kah, Jr. |
| 6,782,311 B2 | 8/2004 | Barlow et al. |
| 7,203,576 B1 | 4/2007 | Wilson et al. |
| 7,328,741 B2 | 2/2008 | Allen et al. |
| 7,383,721 B2 | 6/2008 | Parsons et al. |
| 7,584,023 B1 * | 9/2009 | Palmer ............... A01G 27/00 239/69 |
| 7,631,813 B1 * | 12/2009 | Lichte ............... A01G 27/00 239/11 |
| 7,797,116 B2 | 9/2010 | Berezowski et al. |
| 7,877,168 B1 | 1/2011 | Porter et al. |
| 7,913,653 B2 | 3/2011 | Jordan |

(Continued)

OTHER PUBLICATIONS

United States Patent and Trademark Office, Notice of Allowance mailed Jan. 14, 2014 in U.S. Appl. No. 13/212,933, 10 pages.

(Continued)

*Primary Examiner* — Helen Kwok
(74) *Attorney, Agent, or Firm* — Inskeep IP Group, Inc.

(57) ABSTRACT

The present invention is directed to an irrigation sprinkler sensor for sensing if a sprinkler riser has elevated, if water is flowing through the sprinkler riser, if the sprinkler is rotating, or if a sprinkler valve has properly closed.

23 Claims, 11 Drawing Sheets

(56) References Cited

U.S. PATENT DOCUMENTS

| | | |
|---|---|---|
| 7,949,433 B2 | 5/2011 | Hern et al. |
| 8,733,155 B2 * | 5/2014 | Hill ..................... B05B 12/008 137/78.3 |
| 2004/0030456 A1 | 2/2004 | Barlow et al. |
| 2006/0144957 A1 | 7/2006 | Jacobsen et al. |
| 2007/0119965 A1 * | 5/2007 | Roney ..................... B05B 3/04 239/73 |
| 2014/0339333 A1 * | 11/2014 | Wright, III ............. B05B 15/06 239/204 |

OTHER PUBLICATIONS

United States Patent and Trademark Office, Office Action mailed Jun. 4, 2013 in U.S. Appl. No. 13/212,933, 10 pages.

* cited by examiner

SPRINKLER SENSING DEVICE

RELATED APPLICATIONS

This application is a continuation of U.S. patent application Ser. No. 13/212,933 filed Aug. 18, 2011 entitled Sprinkler Sensing Device, issuing on May 27, 2014 as U.S. Pat. No. 8,733,155, which claims priority to U.S. Provisional Application Ser. No. 61/375,747 filed Aug. 20, 2010 entitled Sprinkler Sensing Device, both of which are hereby incorporated herein by reference in their entireties.

BACKGROUND OF THE INVENTION

Sprinkler systems for turf irrigation are well known. Typical systems include a plurality of valves and sprinkler heads in fluid communication with a water source, and a centralized controller connected to the water valves. At appropriate times the controller opens the normally closed valves to allow water to flow from the water source to the sprinkler heads. Water then issues from the sprinkler heads in predetermined fashion.

There are many different types of sprinkler heads, including above-the-ground heads and "pop-up" heads. Pop-up sprinklers, though generally more complicated and expensive than other types of sprinklers, are thought to be superior. There are several reasons for this. For example, a pop-up sprinkler's nozzle opening is typically covered when the sprinkler is not in use and is therefore less likely to be partially or completely plugged by debris or insects. Also, when not being used, a pop-up sprinkler is entirely below the surface and out of the way.

The typical pop-up sprinkler head includes a stationary body and a "riser" which extends vertically upward, or "pops up," when water is allowed to flow to the sprinkler. The riser is in the nature of a hollow tube that supports a nozzle at its upper end. When the normally-closed valve associated with a sprinkler opens to allow water to flow to the sprinkler, two things happen: (i) water pressure pushes against the riser to move it from its retracted to its fully extended position, and (ii) water flows axially upward through the riser, and the nozzle receives the axial flow from the riser and turns it radially to create a radial stream. A spring or other type of resilient element is interposed between the body and the riser to continuously urge the riser toward its retracted, subsurface, position, so that when water pressure is removed the riser assembly will immediately return to its retracted position.

The riser assembly of a pop-up or above-the-ground sprinkler head can remain rotationally stationary or can include a portion that rotates in continuous or oscillatory fashion to water a circular or partly circular area, respectively. More specifically, the riser of the typical rotary sprinkler includes a first portion (e.g. the riser), which does not rotate, and a second portion, (e.g. the nozzle assembly) which rotates relative to the first (non-rotating) portion.

The rotating portion of a rotary sprinkler riser typically carries a nozzle at its uppermost end. The nozzle throws at least one water stream outwardly to one side of the nozzle assembly. As the nozzle assembly rotates, the water stream travels or sweeps over the ground.

The non-rotating portion of a rotary sprinkler riser assembly typically includes a drive mechanism for rotating the nozzle. The drive mechanism generally includes a turbine and a transmission. The turbine is usually made with a series of angular vanes on a central rotating shaft that is actuated by a flow of fluid subject to pressure. The transmission consists of a reduction gear train that converts rotation of the turbine to rotation of the nozzle assembly at a speed slower than the speed of rotation of the turbine.

During use, as the initial inrush and pressurization of water enters the riser, it strikes against the vanes of the turbine causing rotation of the turbine and, in particular, the turbine shaft. Rotation of the turbine shaft, which extends into the drive housing, drives the reduction gear train that causes rotation of an output shaft located at the other end of the drive housing. Because the output shaft is attached to the nozzle assembly, the nozzle assembly is thereby rotated, but at a reduced speed that is determined by the amount of the reduction provided by the reduction gear train.

SUMMARY OF THE INVENTION

The present invention is directed to an irrigation sprinkler sensor for sensing if a sprinkler riser has elevated, if water is flowing through the sprinkler riser, or if a sprinkler valve has properly closed to block flow at the end of the watering cycle. In one embodiment, the sprinkler sensor includes an acoustic sensor that monitors audio levels to determine the position of the sprinkler riser. In another embodiment, the sprinkler sensor includes an accelerometer or gyroscope that monitors movement of the sprinkler riser. In another embodiment, the sprinkler sensor includes electrodes in a riser's water passage for detecting the presence of water. In yet another embodiment, the sprinkler sensor includes a pressure sensor or turbine for detecting water pressure or water flow to or through the sprinkler riser. In another embodiment, a sprinkler includes a combination of several of these sensors.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
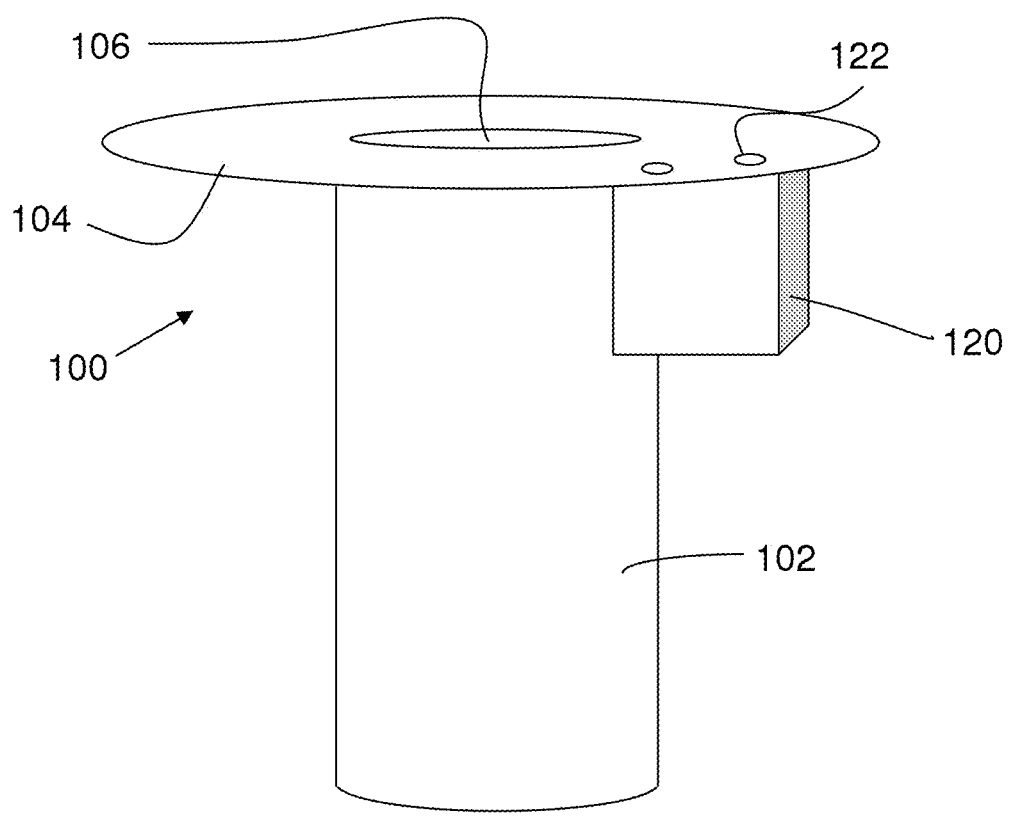
FIGS. 1 and 2 illustrate side views of a sprinkler according to the present invention.

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Figure 2:
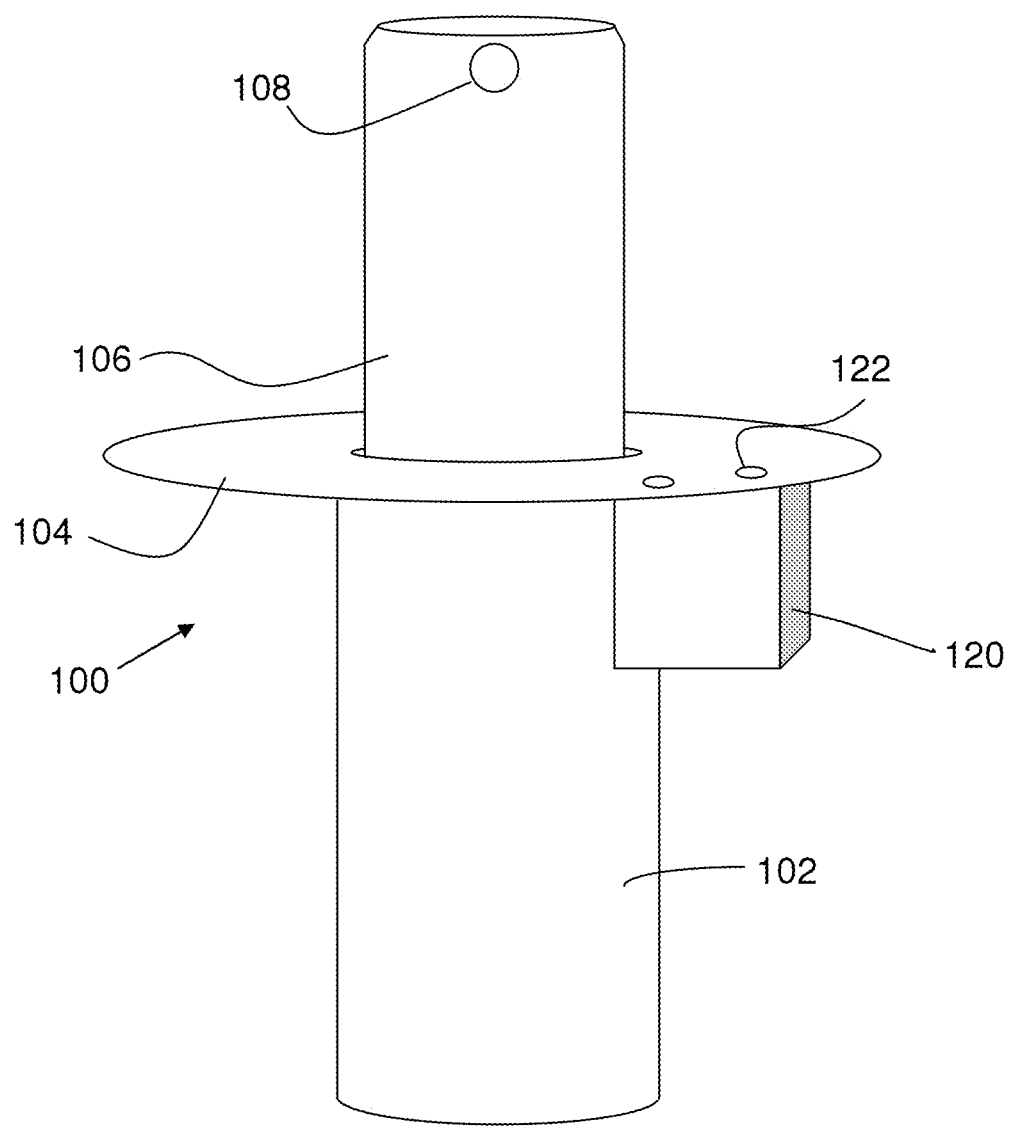

FIGS. 1 and 2 illustrate an external sensing device 120 for sensing various aspects of a sprinkler 100. More specifically, the sensing device 120 monitors various operational aspects of the sprinkler 100 (e.g., the "popped up", elevation status or height of the riser 106, or the rotational position of the riser 106).

In one embodiment, the sensing device 120 is selectively connectable to the sprinkler 100, allowing a user to purchase and install the device 120 onto a sprinkler 100 absent this feature. Hence, the user can upgrade functionality of their sprinklers without the need to purchase expensive new sprinklers. In an alternate embodiment, the sensing device 120 can be molded or fixed unitary with or internal to the main body of the sprinkler 100.

Preferably, the sensing device 120 connects to the underside of a sprinkler flange 104 via attachment members 122 (e.g., screws, tabs, adhesive or other mechanical engagement mechanism). The sensing device 120 may also contact the sprinkler base 102 to allow for more accurate sensing. Alternately, the sensing device 120 connects directly to the sprinkler base 102 via similar attachment members. In another alternate arrangement, some components of the sensor device 120 can be buried next to the sprinkler 100 in an unattached enclosure while other sensor elements (e.g., a microphone) is fixed to the sprinkler and connected to the enclosure via external wire.

Figure 3:
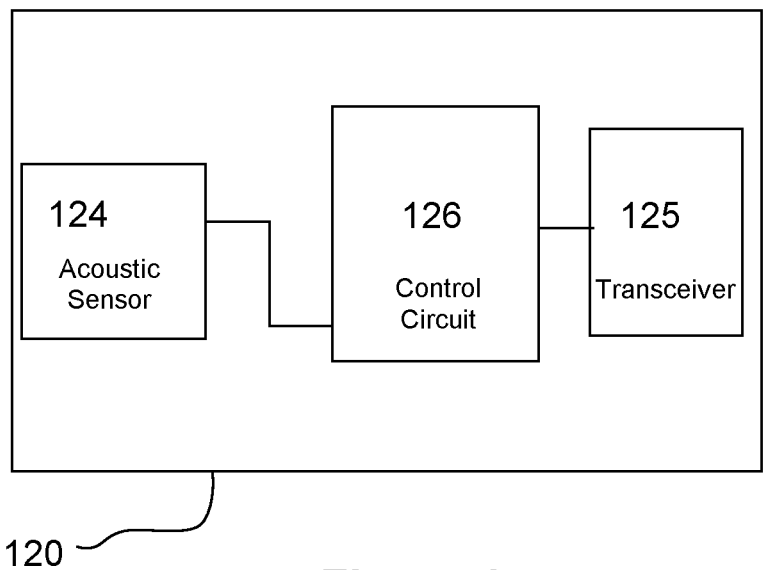
FIG. 3 is a diagram that illustrates an acoustic sensor circuit according to the present invention.

In one embodiment shown in FIG. 3, the sensor device 120 comprises an audio or acoustic sensor 124 (e.g., a microphone) which allows the sensor device 120 to monitor the sound generated from the sprinkler 100 and thereby determine the position of the riser 106. The audio sensor 124 is connected to a processing and control circuit 126 which includes a processor and memory for controlling the sensor 124 (e.g., a microcontroller or discrete components), storing and analyzing data and then communicating with a computer or central controller (e.g., sending a riser elevation level message or a warning message). Alternately, the control circuit 126 may transmit raw data back to a server, computer or central controller for similar analysis and processing.

The circuit 126 is preferably connected to a transceiver 125 that includes either an antenna for wireless communications (e.g., a wireless multihop network, wifi, or similar wireless communication) or a wired data connection port (e.g., two wire irrigation decoder port, or RJ45 Ethernet port). In this respect, the circuit 126 can transmit data about the operations of the sprinkler 100 to a central controller or server for further use.

Figure 5:
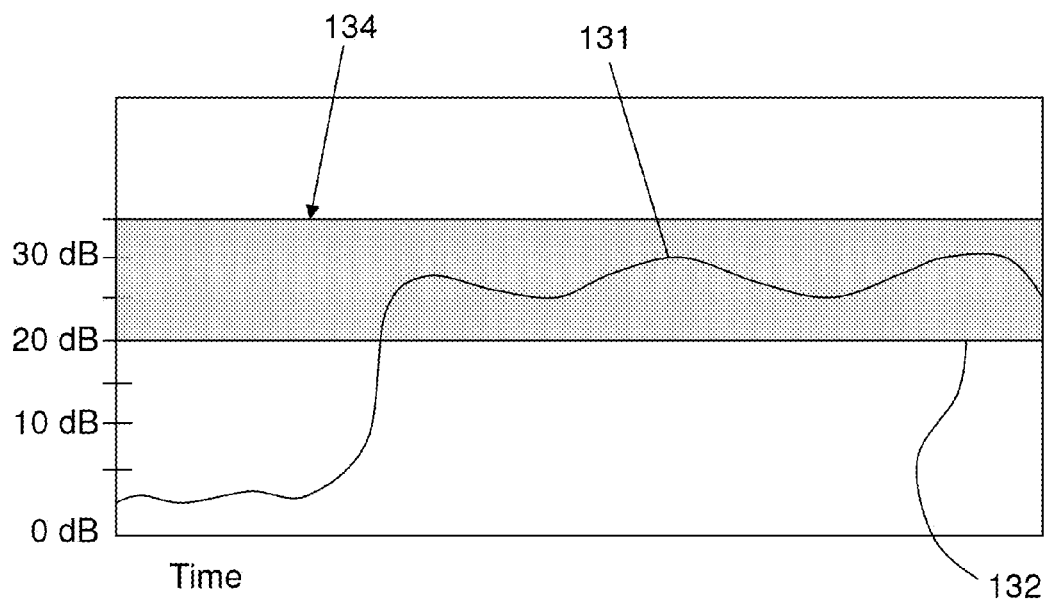
FIG. 5 is a graph that illustrates sound levels and thresholds according to the present invention.

Since, the riser 106 on most sprinklers rises by the force of pressurized water entering the sprinkler 100, pushing up the riser 106, and then exiting via the nozzle 108, this movement of water will typically create a characteristic sound, as seen in the graph of FIG. 5. Additionally, water flowing out the nozzle 108 also creates characteristic sounds that increase or decrease relative to a fixed location on or near the sprinkler 100 as the riser 106 (and therefore the nozzle 108) rotates (assuming the riser is capable of rotation).

In one example, an algorithm performed by the circuit 126 (or optionally by a remote server), determines if the riser 106 has "popped up" or is still within the sprinkler base 102. In the present example shown in FIG. 5, the algorithm monitors if the sound level 131 passes a predetermined threshold 132 or enters a threshold range 134 of sound at predetermined frequencies. When this threshold 132 or range 134 has been reached/entered, the algorithm determines that the riser 106 has fully elevated to a watering position. This information can then be communicated back to a central irrigation controller or server.

Additionally, this algorithm may include a calibration routine which initially measures the frequency and decibel level when the sprinkler 100 is watering with an elevated riser 106. This frequency information and decibel level information can then be used by the algorithm to determine the threshold 132 or threshold range 134 sound levels and frequencies (e.g., the decibel range 134 in FIG. 5). Optionally, the algorithm may only use decibel level over a broad frequency range (e.g., all frequencies sensed by a microphone) or presence of a characteristic frequency or group of frequencies (e.g., certain lower frequencies, certain high frequencies, or select combinations of both).

This algorithm may also measure sound when the sprinkler riser is not elevated or rotation so as to determine the ambient or background level/characteristics of other nearby sounds. This background or ambient measurement may occur during calibration or prior to the intended activation of each sprinkler. For example, if the sound level is generally similar prior to an intended sprinkler activation and prior to the intended activation, a warning or alarm signal may be generated. In this respect, the algorithm may be better able to compensate for other noises and detect relative changes in sound created by an active sprinkler.

In another example, an algorithm monitors a specific range of sound for regular or repeating increases and decreases in sound levels within a predetermined range 134, as seen in FIG. 5. If repeated sound variations occur with the range (e.g., a pattern of increasing and then decreasing sound), the algorithm determines that the riser 106 is rotating.

In another example, the algorithm can also determine how many arc rotations have occurred by monitoring for a characteristic sound of the trip mechanism activating. The trip mechanism is typically used to reverse the rotational direction of a sprinkler's riser once the riser has rotated to the end of a predetermined arc limit. By monitoring when the trip mechanism is activated, the number of watered arcs can be communicated to the central controller or server.

Additionally, the central controller or server can be programmed to monitor and water only complete arcs, a specific number of arcs, or a combination of time and watering arcs. For example, a central controller may be programmed to cause a sprinkler to water for 5 minutes. However, the software may continue watering for several extra seconds until the sensor device 120 determines that the trip mechanism has been tripped. In this respect, water will typically be dispersed evenly over the entire watering arc.

Alternately, the algorithm may determine "complete" arcs by monitoring the peaks and valleys of the measured sound level at the sprinkler. For example, the algorithm may extend irrigation until the sound level achieves the next peak (or similar "position" on the sound measurement graph). The algorithm may also calculate the average time between peaks to determine the sprinkler's time of arc rotation and then extend irrigation until a full arc has been completed (i.e., rotated through and watered).

Figure 4:
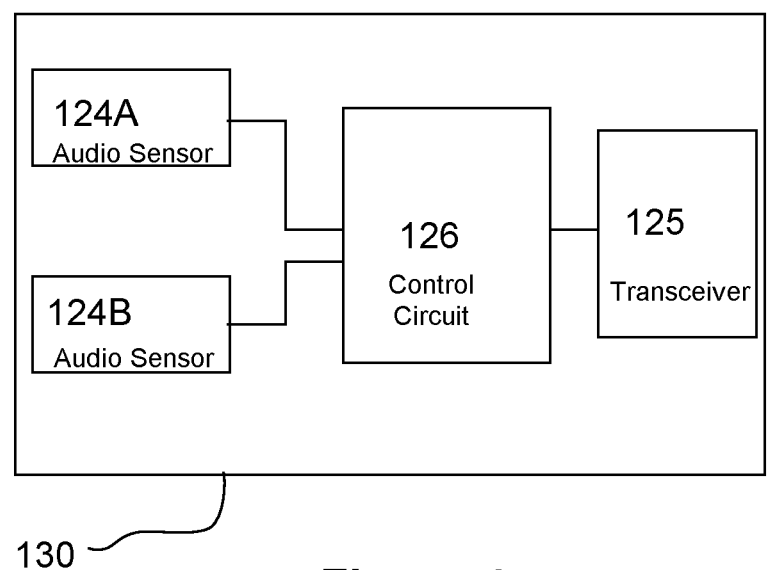
FIG. 4 is a diagram that illustrates a stereo acoustic sensor circuit according to the present invention.

FIG. 4 illustrates another preferred sensor device 130 that is generally similar to the previously described sensor device 120, but has a first audio sensor 124A and a second audio sensor 124B. In other words, the device 130 can capture stereo audio. In this respect, an algorithm can monitor the sound levels of each audio sensor 124A, 124B for variation. For example, regular decibel level alternation of a sound within a predetermined threshold volume range may indicate that the nozzle 108 is changing distance between the two audio sensors 124A, 124B and therefore that the riser 106 is rotating and reversing in certain applications. This information can be communicated back to a central server for display to a user (e.g., a specific sprinkler is popped up and rotating properly).

Additionally, the sensor device 130 can be used to calculate the angular position of the nozzle 108. For example, the position could be calculated by comparing the sound level from each audio sensor 124A, 124B. Since the nozzle 108 creates noise when dispensing water, each audio sensor 124A, 124B will generally have a different audio level at different positions of the nozzle 108. However, when the nozzle 108 is directly opposite of the sensor device 130, the sound from the nozzle 108 will be about even for each audio sensor. As the nozzle 108 rotates towards one audio sensor, the sound level will be higher for that audio sensor and lower for the other audio sensor. In this respect, the sensor device 130 can determine rotational orientation of the nozzle 108 and transmit that data back to the central controller or server.

Figure 6:
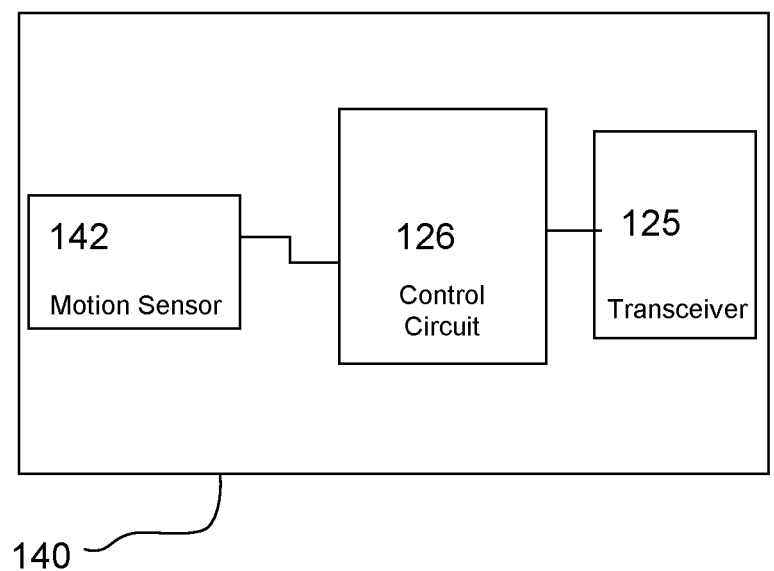
FIG. 6 is a diagram that illustrates a movement sensor according to the present invention.

FIG. 6 illustrates a preferred embodiment of a sensor device 140 which uses a motion sensor 142 to detect movement. The motion sensor 142 can include an accelerometer chip, a gyroscope chip or both. Preferably the motion sensor 142 can detect movement along an X, Y and Z axis. A compass sensor can also be included for determining the X and Y positions relative to magnetic North.

Figure 7:
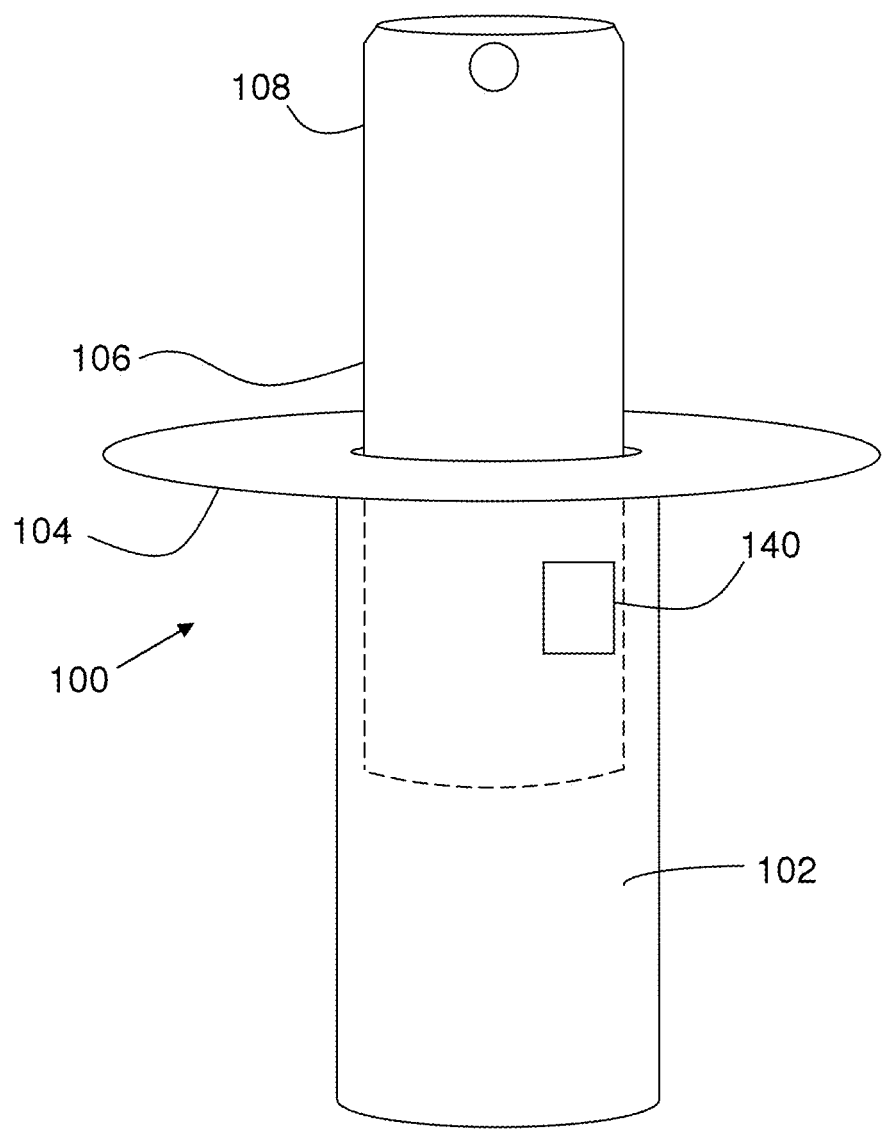
FIG. 7 illustrates a side view of a sprinkler including the movement sensor of FIG. 6.

As seen in FIG. 7, the sensor device 142 is preferably coupled to a bottom portion of the riser 106 so as to detect its vertical or rotational movement. In one example, the sensor device 140 can be fixed within the riser 106. In another example, the sensor device 140 can be fixed on an outer surface of the riser 106 (e.g., the top surface of the riser 106). In another example (not shown), the sensor device 142 can be coupled to the upper portion of the riser 106 or to the outer flange 104 or base 102 to monitor for movement of the base 102 as the riser 106 elevates.

As the riser 106 extends upwards and rotates, the sensor device 140 detects vertical and rotational movement and then communicates this movement to the control circuit 126. The control circuit 126 (or optionally a remote server) executes an algorithm for analyzing this raw motion data to recognize the vertical and rotational movement. For example, the algorithm may have a predetermined upper and lower threshold for each axis. In this respect, when acceleration on the vertical Z-axis (i.e., the axis oriented along the direction of "popping up" of the riser 106) increases beyond an upper threshold, the algorithm determines that the riser 106 is moving upward and when acceleration decreases lower than the lower threshold, the algorithm determines that the riser 106 has moved to it's fully raised position. Similarly, when acceleration on the X-axis and/or the Y-axis reaches a predetermined threshold, the algorithm determines that the riser 106 is rotating.

The thresholds for each axis can be preset or can be determined during a calibration mode (similar to the previously described calibration mode) in which the sprinkler 100 is activated, providing baseline threshold levels for the algorithm. Additionally, the time of acceleration, especially with regard to the Z axis, can be measured during calibration. Hence, if the time of acceleration is significantly shorter than during an initial calibration, the sensor device 140 can signal or send data to the central controller indicating that the riser 106 on sprinkler 100 may not have fully risen or popped up.

Figure 8:
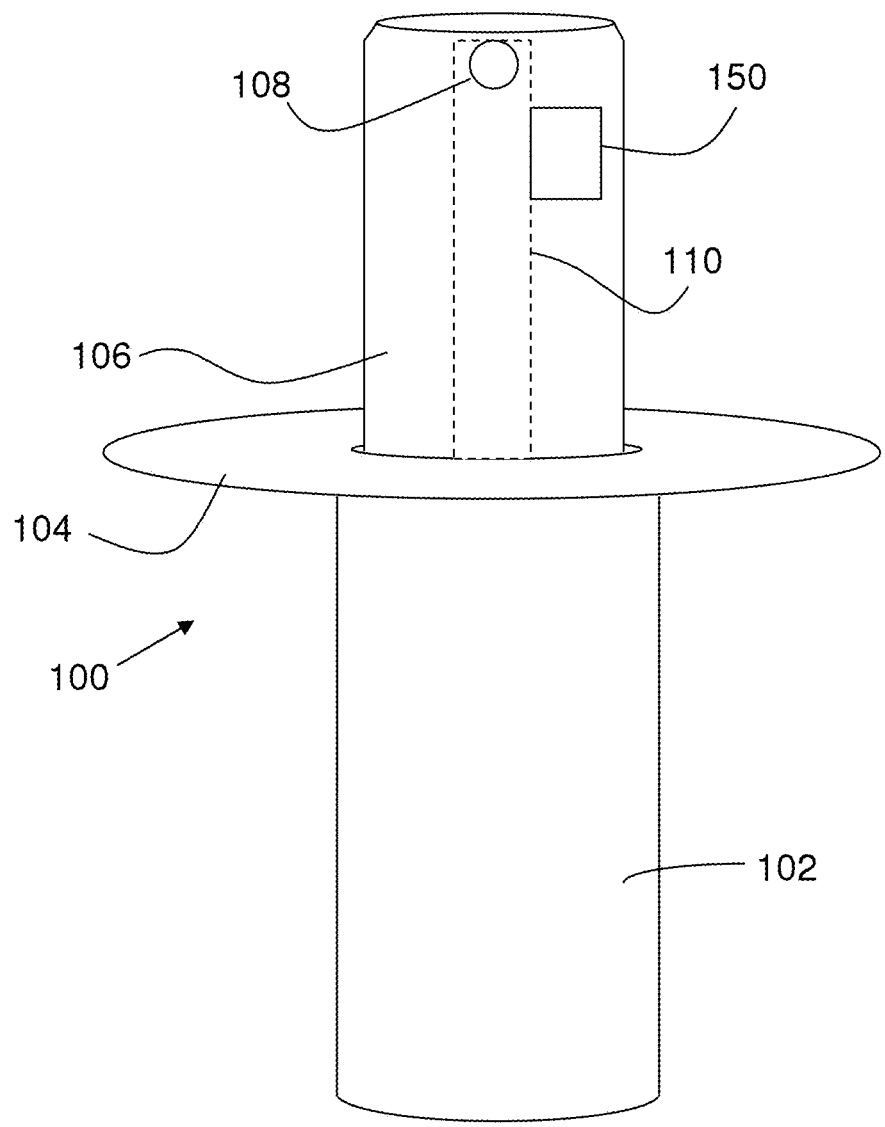
FIG. 8 illustrates a side view of a sprinkler including a water sensor according to the present invention.
Figure 9:
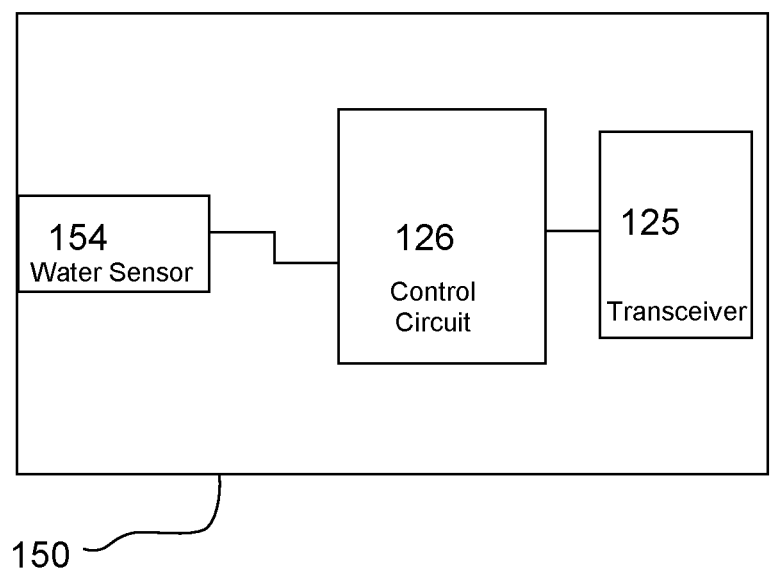
FIG. 9 is a diagram that illustrates the water sensor of FIG. 8.

FIGS. 8 and 9 illustrate another preferred embodiment in which a sensor device 150 detects the presence of water within a tube 110 of the riser 106. Since water only enters this passage when water is being supplied to the sprinkler 100 (i.e., the sprinkler 100 is on), water detection indicates that the sprinkler is irrigating.

Preferably the sensor device 150 includes a water sensor 154, such as two electrodes that register a water signal when water completes an electrical circuit between them. In this respect, two electrodes can be positioned on an external surface of the sensor device 150 or can be located on opposite sides of the tube 110. Preferably, the sensor device 150, and the electrodes (if present), are connected to or are in communication with the water tube 110 of riser 106. For example, the water tube 110 may include a window or aperture sealed to the outer housing of the sensor device 150, exposing the electrodes to the inside of the tube 110. Preferably, an electrode may be located on each side of the water tube 110 to reduce false signals from leftover water or moisture. Alternately, the sensor device 150 may sense induction to determine the presence of water in the water tube 110. Preferably, the water sensor 154 is positioned at a location that does not otherwise retain water when the sprinkler is not in operation (e.g., some sprinklers include a one-way "check valve" that retains some water in a portion of the sprinkler).

Alternately, the sensor device 150 may be a pressure sensor that detects an increase in pressure in tube 110 as water enters the sprinkler. In this respect, when an increased pressure is detected, the sensor device 150 determines that the riser 106 has popped up. While the sensor device 150 is shown in the riser 106, it may also be located at nearly any other location in the sprinkler 100 that is in communication with water.

Figure 10:
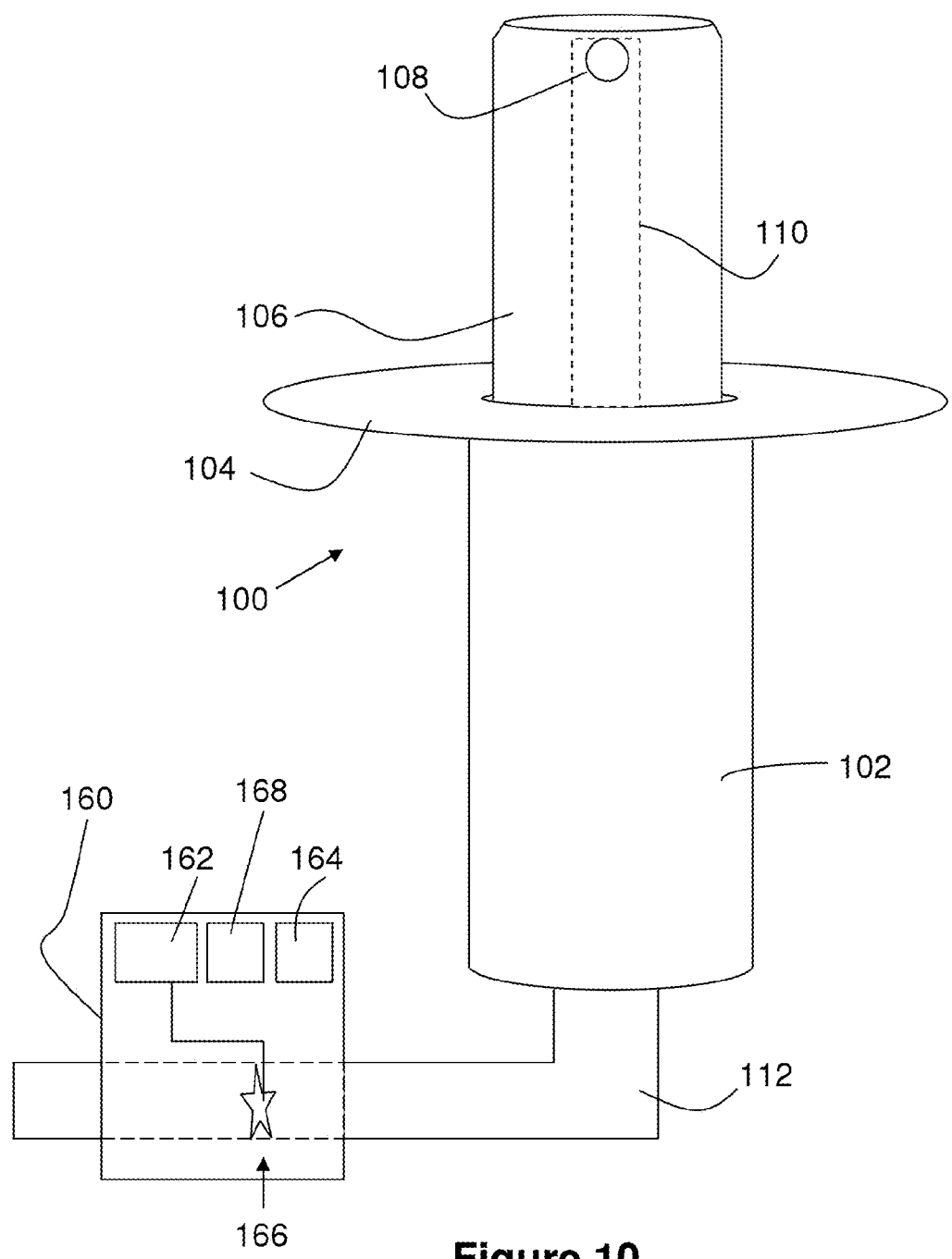
FIG. 10 illustrates a side view of a water flow sensor connected to a sprinkler according to the present invention.

FIG. 10 illustrates a preferred embodiment of a sensor device 160 that determines the operation of the sprinkler 100 based on its local water usage. More specifically, the sensor device 160 uses a turbine 166 (or similar device that rotates in moving water such as a paddle) which is located in a passage that is connected to or otherwise in communication with the water supply pipe 112. The water supply pipe 112 branches off of a larger water supply pipe and preferably only supplies water to sprinkler 100.

When the sprinkler 100 is activated, water in the water supply pipe 112 begins moving, causing the turbine 166 to rotate. The turbine 166 is preferably connected to a sensor mechanism that detects rotation of the turbine 166. Optionally, the turbine 166 may be coupled to a mechanism to generate power. In this respect, generation of power determines when the sprinkler is operating and generates power for use with the sensor device 160.

As with previously described sensor devices in this specification, the sensor device 160 includes a control circuit 162 and a communications circuit 168 (e.g., either wired or wireless). Additionally, the sensor device 160 includes a rechargeable battery 164 (or alternately a capacitor) which can be charged from movement of the turbine 166. Hence, the sensor device 160 can generate and store its own power, reducing the need for replacement of the battery 164.

Figure 11:
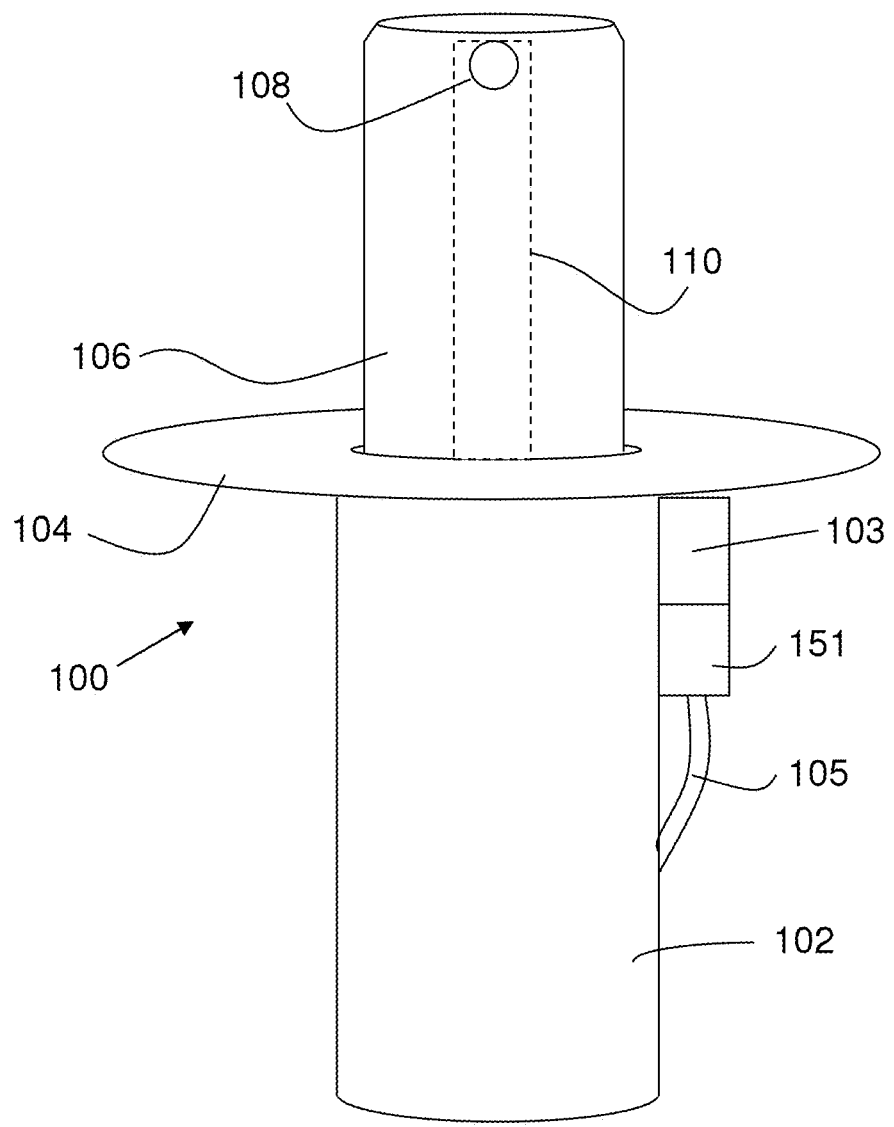
FIG. 11 illustrates a side view of water pressure sensor connected to a sprinkler according to the present invention.

In another example of FIG. 11, a sensor device 151 is connected to the communication tube 105 of the pilot valve 103. In this respect, a higher pressure indicates that the valve within the sprinkler is closed while a decrease in pressure indicates that the valve is open and the sprinkler 100 is disbursing water. This information can be transmitted to the central controller or server.

Additionally, any of the previously described sensor devices can be used as a failsafe sensor for two wire decoder system. For example, if the two wire decoder system transmits a stop signal to the decoder on the sprinkler, but the sensor detects that water is still flowing from the sprinkler, a fault or error message can be created and displayed for the user (e.g., on a central controller). Hence, the user is quickly alerted to any malfunctions in the decoder system or sprinkler.

It should be understood that while each of the embodiments of this specification can be used separately, some may also be used in combination with each other. Additionally, the sprinkler information provided by the sensors of these embodiments can be used with a software interface such as that seen in U.S. Pat. No. 7,584,023, the contents of which are herein incorporated by reference.

Figure 12:
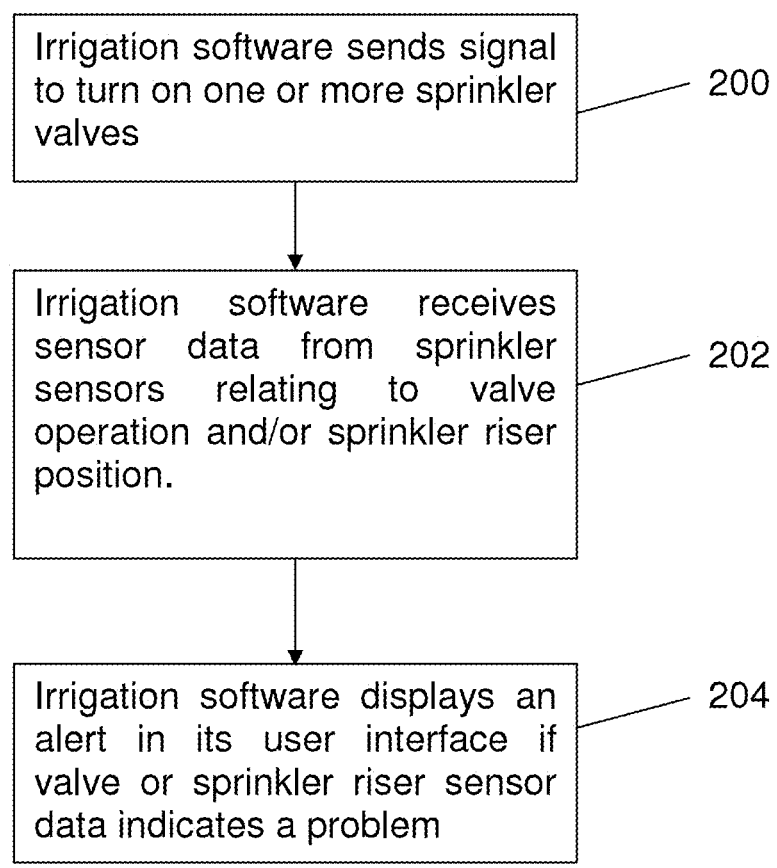
FIG. 12 is a flow chart illustrating a method of displaying an alert, based on data from a sprinkler sensor according to the present invention.

FIG. 12 illustrates a flow chart of a method according to the present invention for displaying an alert to a user, based on sensor data received from the previously described sprinkler sensors. In 200, the irrigation software sends a signal to turn on a single sprinkler or a group of sprinklers. In 202, the irrigation software receives sensor data from each sprinkler it directed to irrigate and reviews this data for warnings, errors or other problems. Alternately, the sensor data from each sprinkler may only be sent to the irrigation software if a warning or error condition is sensed. In 204, if a problem or error is noted in the sensor data, the irrigation software displays an alert on its user interface regarding the error. Preferably, this alert indicates which sprinkler has an error associated with it (e.g., sprinkler 10) and any additional information about the alert (e.g., the riser failed to elevate or the decoder valve failed to turn off).

The alert can occur by changing the color or shape of a sprinkler icon on an irrigation software map of the area or on a list of sprinklers in the irrigation system. In one specific example, a sprinkler icon on a geographic map of the irrigated area turns red and blinks. The user can click or "hover over" the icon with a mouse icon to gain more information about the cause of the alert.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of determining a position of a riser on a sprinkler, comprising:
sensing a riser position with a sprinkler sensing device located at a sprinkler; said sprinkler sensing device comprising a sensor selected from a group of an acoustic sensor, an accelerometer, a gyroscope, a water sensor, a pressure sensor, and a turbine;
receiving sensor data from said sensor with a control circuit that is connected to said sensor; and,
transmitting a sprinkler signal from a transmitter connected to said control circuit, to an irrigation controller; wherein said sprinkler signal is based on said sensor data.

2. The method of claim 1, wherein said sprinkler signal contains said sensor data and wherein said irrigation controller determines said riser position.

3. The method of claim 1, wherein said control circuit determines said riser position and wherein said sprinkler signal communicates said riser position.

4. The method of claim 1, wherein said sensor is said acoustic sensor.

5. The method of claim 4, wherein said acoustic sensor comprises two microphones.

6. The method of claim 1, wherein said sensor is said accelerometer.

7. The method of claim 1, wherein said sensor is said gyroscope.

8. The method of claim 1, wherein said sensor is said water sensor.

9. The method of claim 1, wherein said sensor is said pressure sensor.

10. The method of claim 1, wherein said sensor is said turbine.

11. The method of claim 1, wherein said sensor comprises an enclosure configured to mount on an underside of a sprinkler flange.

12. The method of claim 1, wherein said control circuit determines an elevation and rotational position of said riser of said sprinkler.

13. The method of claim 1, further comprising displaying an alert on a user interface of said irrigation controller based on said sprinkler signal.

14. The method of claim 13, wherein said alert indicates that said riser failed to elevate.

15. A method of determining a position of a riser on a sprinkler, comprising:
sensing with a sprinkler sensing device located at a sprinkler; said sprinkler sensing device comprising a sensor selected from a group of an acoustic sensor, an accelerometer, a gyroscope, a water sensor, a pressure sensor, and a turbine;
receiving sensor data from said sensor with a microcontroller that is connected to said sensor;
determining a riser position with said microcontroller based on said sensor data; and,
transmitting a sprinkler signal from a transmitter connected to said microcontroller to an irrigation controller; wherein said sprinkler signal communicates said riser position.

16. The method of claim 15, wherein said irrigation controller is a central irrigation controller.

17. The method of claim 15, wherein said sensor comprises said acoustic sensor.

18. The method of claim 17, wherein said determining said riser position further comprises comparing said sensor data to a predetermined sound level threshold.

19. The method of claim 16, wherein said determining said riser position further comprises comparing said sensor data to a predetermined sound level range.

20. The method of claim 15, wherein said sensor comprises at least two microphones.

21. A method of determining a position of a riser on a sprinkler, comprising:
sensing with an acoustic sensor located at a sprinkler;
receiving sound data from said acoustic sensor with a microcontroller that is connected to said acoustic sensor;
determining a riser position with said microcontroller based on said sound data and a predetermined sound threshold.

22. The method of claim 21, wherein said acoustic sensor comprises two microphones.

23. The method of claim 21, wherein said determining a riser position further comprises determining an elevation and rotational position of said riser.

\* \* \* \* \*